(12) United States Patent
Bennett

(10) Patent No.: US 12,377,966 B2
(45) Date of Patent: Aug. 5, 2025

(54) AIRCRAFT LANDING GEAR ASSEMBLY

(71) Applicant: SAFRAN LANDING SYSTEMS UK LTD., Gloucester (GB)

(72) Inventor: Ian Robert Bennett, Gloucester (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/684,605

(22) PCT Filed: Aug. 26, 2022

(86) PCT No.: PCT/EP2022/073770
§ 371 (c)(1),
(2) Date: Feb. 16, 2024

(87) PCT Pub. No.: WO2023/031035
PCT Pub. Date: Mar. 9, 2023

(65) Prior Publication Data
US 2025/0121932 A1    Apr. 17, 2025

(30) Foreign Application Priority Data
Aug. 31, 2021  (EP) .................................... 21194061

(51) Int. Cl.
*B64C 25/12* (2006.01)
(52) U.S. Cl.
CPC .................................. *B64C 25/12* (2013.01)
(58) Field of Classification Search
CPC ....................................................... B64C 25/12
See application file for complete search history.

(56) References Cited

U.S. PATENT DOCUMENTS

2009/0057485 A1*  3/2009  Seror-Goguet ......... B64C 25/26
                                                244/102 SL
2011/0278394 A1* 11/2011  Ditzler ................... B64C 25/24
                                                244/102 R
(Continued)

FOREIGN PATENT DOCUMENTS

| EP | 1988015 A1 | 11/2008 |
| EP | 2386487 A2 | 11/2011 |
| FR | 2503086 A1 | 10/1982 |

OTHER PUBLICATIONS

European Search Report and Search Opinion received for EP Application No. 21194061.4, mailed on Feb. 9, 2022, 9 pages.
(Continued)

*Primary Examiner* — Tye William Abell
(74) *Attorney, Agent, or Firm* — Womble Bond Dickinson (US) LLP

(57) ABSTRACT

An aircraft landing gear assembly including a first structural member; a second structural member pivotally coupled to the first structural member to be movable between a first angular condition and a second angular condition; a down-lock spring having a first end region pivotally coupled to a mounting structure under tension to bias the first and second structural members to assume the first angular condition; and a linkage assembly including an arm member pivotally coupled to one of the first and second structural members at an arm pivot point, the arm having an first end region pivotally coupled to a second end region of the down-lock spring; and a control link pivotally coupled to one of the first and second structural members at a first control link pivot point and pivotally coupled to the arm member at a second control link pivot point.

14 Claims, 13 Drawing Sheets

(56) References Cited

U.S. PATENT DOCUMENTS

2018/0065733 A1* 3/2018 Mellor ................... B64C 25/26
2024/0326992 A1* 10/2024 Bennett .................. B64C 25/20

OTHER PUBLICATIONS

International Search Report and Written Opinion received for PCT Patent Application No. PCT/EP2022/073770, mailed on Sep. 29, 2022, 14 pages.
Office Action received for European Application No. 21194061.4, mailed on Jan. 17, 2024, 8 pages.

* cited by examiner

AIRCRAFT LANDING GEAR ASSEMBLY

BACKGROUND TO THE INVENTION

An aircraft landing gear assembly is generally movable between a deployed condition, for take-off and landing, and a stowed condition for flight.

One or more stay assemblies may be provided to support the orientation of the main strut when the landing gear assembly is in the deployed condition. A stay assembly generally includes a stay and a lock link arranged to maintain the stay in a condition which corresponds to the landing gear assembly being in the deployed condition. The lock link is 'broken' and folded to enable the stay to be folded, permitting the main strut to be moved by a retraction actuator towards the stowed condition.

It is common for landing gear assemblies to be arranged to move towards the deployed condition in the event of a failure of the retraction actuator. Initially the assembly will move by way of gravity and in doing so the landing gear assembly forces the stay to move towards the condition which corresponds to the landing gear assembly being in the deployed condition. One or more 'down-lock' springs may be provided to assist in moving landing gear assembly to the deployed condition and locking it in that state by biasing the lock link to lock. Landing gear assemblies for larger aircraft may be provided with a pair of down-lock springs on each stay assembly.

In order to meet down-lock requirements, particularly on larger aircraft, such as those requiring four or six wheeled bogie beams on the main landing gear assembly (MLG), large down-lock springs are required. In some cases this is due to the characteristics of a 'four point' attachment dual stay MLG, where the dual stays provide attachment points on the forward and aft sides of the landing gear to transfer drag and side loads into the airframe. Springs with a large wire diameter can however be undesirably heavy and can be difficult to manufacture.

The present inventor has devised a new type of aircraft landing gear assembly which can enable the use of lighter springs.

SUMMARY OF INVENTION

According to a first aspect of the invention, there is provided an aircraft landing gear assembly comprising:
  a first structural member;
  a second structural member pivotally coupled to the first structural member at an apex pivot point so as to be movable between a first angular condition and a second angular condition distinct from the first angular condition;
  a down-lock spring having a first end region pivotally coupled to a mounting structure and being arranged under tension to bias the first and second structural members to assume the first angular condition; and
  a linkage assembly, the linkage assembly comprising:
    an arm member pivotally coupled to one of the first and second structural members at an arm pivot point, the arm having an first end region pivotally coupled to a second end region of the down-lock spring; and
    a control link pivotally coupled to one of the first and second structural members at a first control link pivot point and pivotally coupled to the arm member at a second control link pivot point the such that, as the first and second structural members move relative to one another from the first angular condition towards the second angular condition, the first control link pivot point moves over centre, though an axis or plane bisecting the apex pivot point and the second control link pivot point.

Thus, an aircraft landing gear assembly according to the first aspect of the invention includes a linkage assembly which builds lost motion into the down-lock spring mounting mechanism. As the structural members move from the first angular condition to the second angular condition, the control link moves over centre such that, in contrast to known landing gear assemblies, the down-lock spring does not continue to extend as the gear is retracted, thereby enabling a smaller and/or lighter down-lock spring to be provided. The structural members can for example comprise elements of a stay or lock link arranged to maintain the gear in a deployed condition, or a mix of stay and lock link.

The linkage assembly can be arranged such that, as the structural members move from the first angular condition to the second angular condition, the spring extension is increased or magnified in comparison to a direct connection arrangement for a first portion of the movement and/or is reduced in comparison to a direct connection arrangement for a second portion of the movement.

The second portion of the movement can start within the first half of the total movement of the landing gear from the fully deployed to the fully stowed condition.

The magnification can be by at least a factor of 1.2 and preferably at least a factor of 1.3, 1.5 or 2, which can particularly assist the spring in locking the gear in the deployed condition as it nears the deployed condition. The magnification factor can refer to a maximum value.

The degree of magnification can vary throughout the first portion of the movement. The variation can be in accordance with the angle of the structural member (to which the arm member is pivotally coupled) relative its orientation when in the first angular condition, in which the landing gear is in the deployed condition.

At least some magnification can occur throughout the first portion of the movement. The first portion of the movement can comprise less than 15 degrees of movement of the structural member (to which the arm member is pivotally coupled) relative its orientation when in the first angular condition. In one embodiment the first portion can comprise 0 to 10 degrees.

The reduction can be by at least a factor of 2 and preferably at least a factor of 3 or 4. This can reduce maximum spring extension during retraction of the gear, enabling the use of lighter and/or smaller down-lock springs. The reduction factor can refer to a maximum value.

The reduction factor can result in the spring being shorter at some point during retraction than when the gear is in the deployed condition, preferably when the gear is in the stowed condition.

The degree of reduction can vary throughout the second portion of the movement. The variation can be in accordance with the angle of the structural member (to which the arm member is pivotally coupled) relative its orientation when in the first angular condition, in which the landing gear is in the deployed condition.

At least some reduction can occur throughout the second portion of the movement. The second portion of the movement can start at 10 or more degrees of movement of the structural member (to which the arm member is pivotally coupled) relative its orientation when in the first angular condition and can extend to 70 degrees or more.

The first angular condition can be an aligned condition, in which longitudinal axes of the first and second structural members are generally aligned with one another, and the second angular condition can be a non-aligned condition in which the longitudinal axes of the first and second structural members are generally not aligned with one another. In such embodiments, the spring acts across the folding joint of a stay or lock link for example.

The arm member can be longitudinally nonlinear.

The arm member can be longitudinally C shaped.

The arm member can comprise a plurality of linear portions rigidly coupled to form the longitudinal C shape.

The arm member can be pivotally coupled to the second structural member, the arm pivot point being at a first end region of the arm and the control link being pivotally coupled to the first structural member.

The second control link pivot point can be located on the arm at a location which is closer to the arm pivot point than the point via which the arm is pivotally coupled to the spring.

The arm pivot point can be at a central region of the arm.

The arm member can be pivotally coupled to the first structural member, the control link being pivotally coupled to the second structural member and the second control link pivot point being located at a second end region of the arm opposite to the first end region which is pivotally coupled to the down-lock spring.

The arm member can be pivotally coupled to the first structural member, the control link being pivotally coupled to the second structural member and the linkage assembly further comprising a second C shaped arm pivotally coupled to the second structural member at a second arm pivot point located at a central region of the second arm, the second control link pivot point being located at a first end region of the second arm, the linkage assembly further comprising a second control link pivotally coupled to one of the first and second structural members at a first control link pivot point and pivotally coupled to a second end of the second arm at a third control link pivot point and pivotally coupled to a second end of the C shaped arm at a fourth control link pivot point such that, as the first and second structural members move relative to one another from the aligned condition towards the non-aligned condition, the first control link pivot point moves over centre, though an axis or plane bisecting the apex pivot point and the second control link pivot point and the third control link pivot point moves over centre, though an axis or plane bisecting the arm pivot point and the fourth control link pivot point. Thus, a cascading arrangement can be provided.

The first structural member can be a first arm of a stay or lock link and the second structural member can be a second arm of the stay or lock link.

The first structural member can be a first arm of one of a stay or lock link and the second structural member can be a second arm of a second one of the stay or lock link.

The aircraft landing gear assembly can further comprise:
a shock absorber strut arranged to be moved between a deployed condition for take-off and landing and a stowed condition for flight; and
a wheel or other ground contacting assembly coupled to the shock absorber strut, wherein the landing gear assembly is arranged such that the shock absorber strut is held in the deployed condition when the first and second structural members are in the first angular condition.

The down-lock spring can be helical in shape.

In accordance with a second aspect of the invention, there is provided an aircraft including one or more aircraft landing gear assemblies according to the first aspect.

BRIEF DESCRIPTION OF THE DRAWINGS

Embodiments of the invention will now be described, strictly by way of example only, with reference to the accompanying drawings, of which.

DESCRIPTION OF EMBODIMENTS

Figure 1:
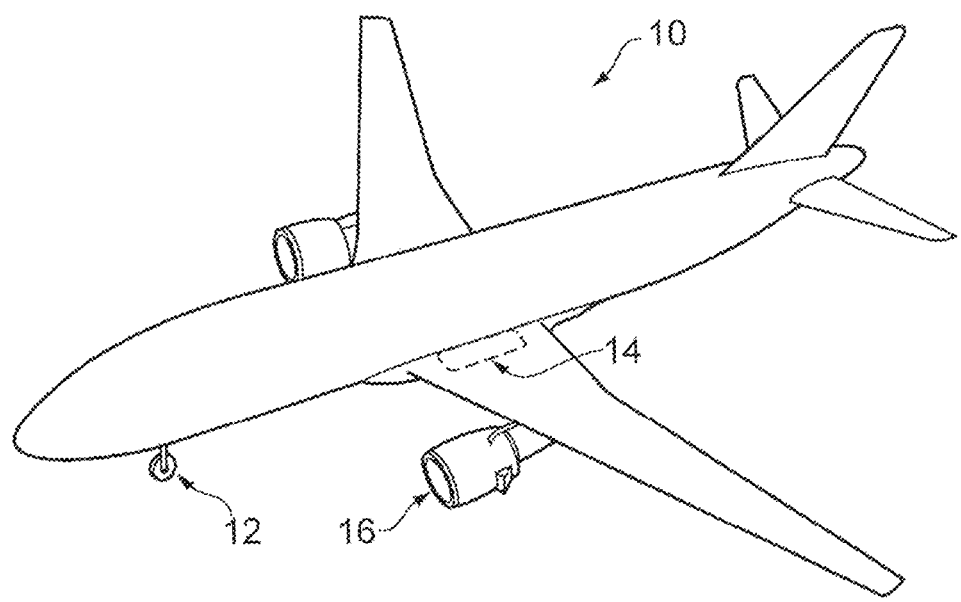
FIG. 1 is a diagram of an aircraft.

FIG. 1 is a diagram of an aircraft 10. The aircraft 10 includes assemblies such as a nose landing gear 12, main landing gear 14 and engines 16. The landing gear 12, 14 each includes a shock absorber strut for damping landing loads and supporting the weight of the aircraft 10 when it is on the ground. The term aircraft as used herein can include aeroplanes, helicopters and the like having mass in excess of 450 Kg.

Referring now to FIGS. 2a to 2e, an aircraft assembly, namely an aircraft landing gear assembly, is shown generally at 14. FIGS. 2a to 2e are an example of an aircraft landing gear assembly which can include a shock absorber strut according to an embodiment of the invention. It will however be appreciated that shock absorber struts according to embodiments of the invention can be used in a range of types of aircraft landing gear.

The landing gear assembly 14 includes a foldable stay 18, a lock link 20 and a down-lock spring assembly 22 mounted to the stay 18 and arranged to urge the lock link 20 to assume a locked state. The landing gear assembly also includes a main shock absorber strut 24, comprising an outer cylinder 26 and an inner cylinder 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the outer cylinder such that extension and retraction of the actuator results in movement of the outer cylinder between deployed and stowed conditions.

Figure 2A:
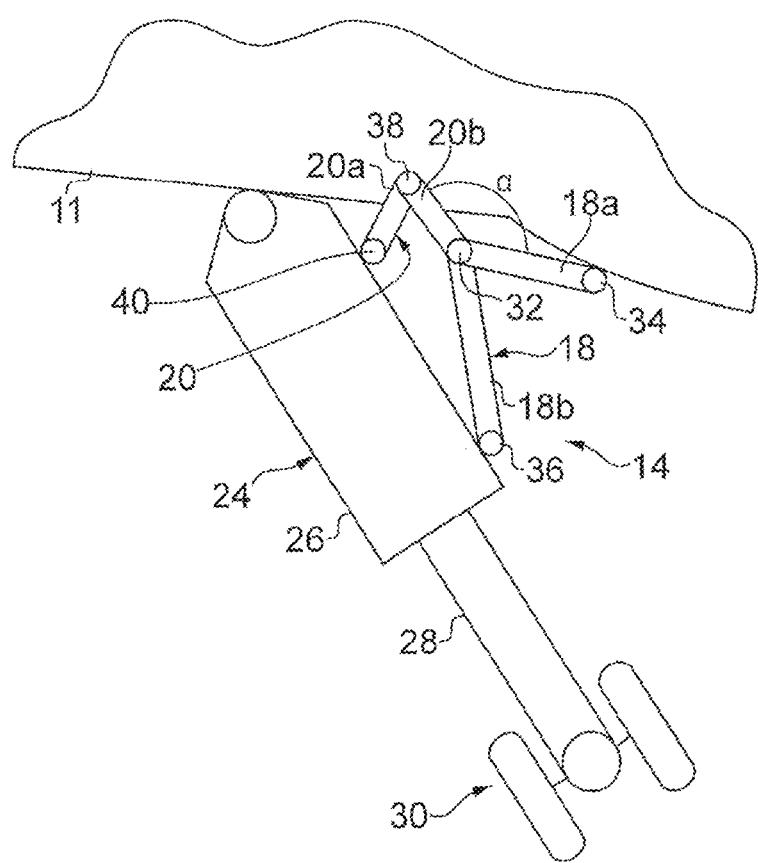
FIGS. 2a to 2e are diagrams of an aircraft landing gear assembly.
Figure 2B:
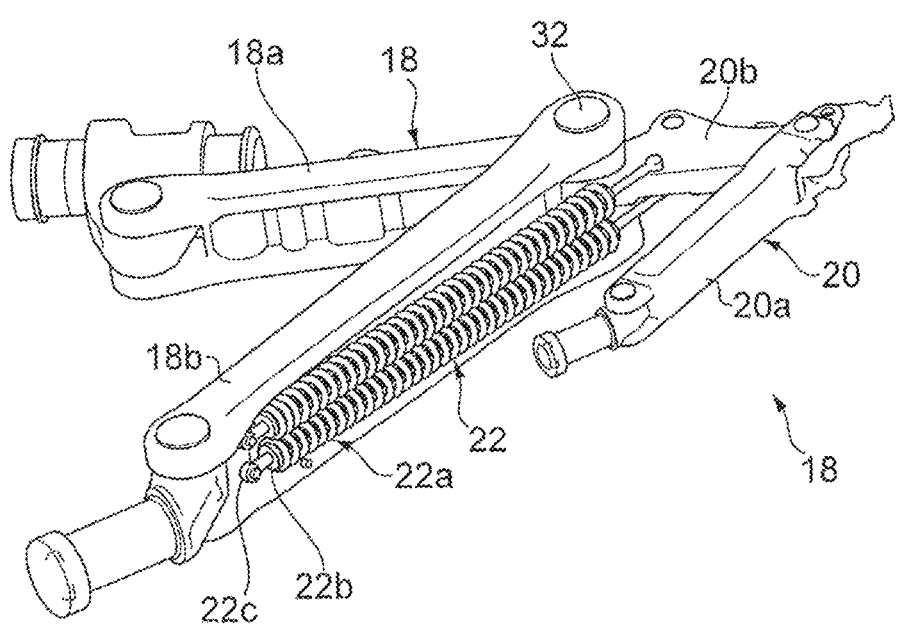
Figure 2C:
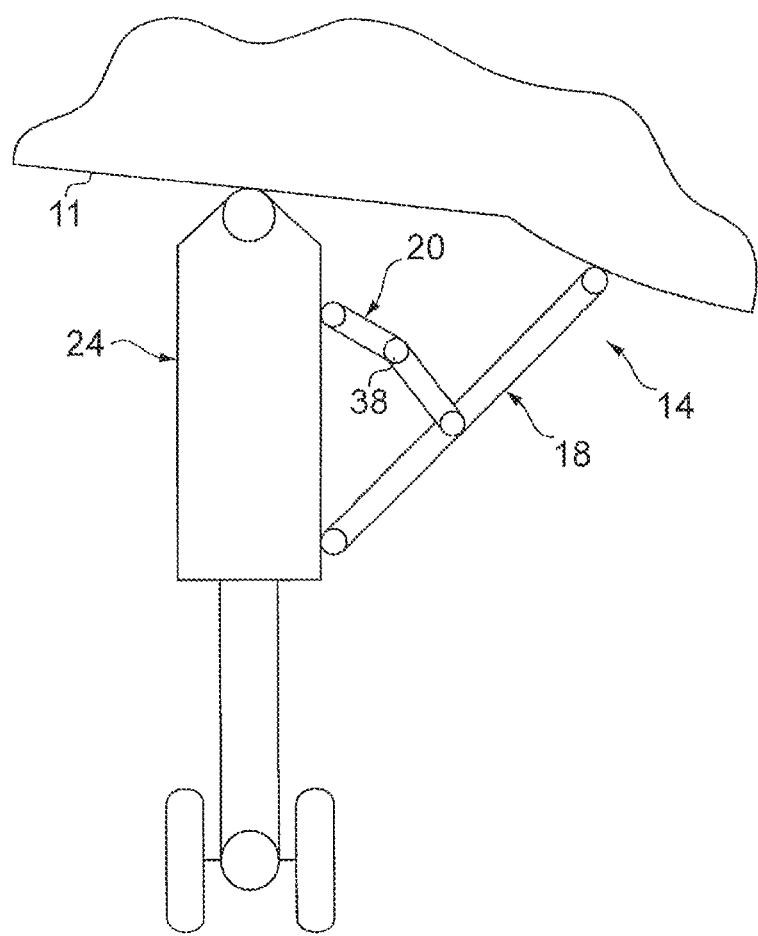

The stay 18 serves to support the orientation of the outer cylinder 26 when the landing gear is in the deployed condition. The stay 18 generally includes a two bar linkage that can be unfolded to assume a generally straight or aligned, over centre condition in which the stay 18 is locked to inhibit movement of the outer cylinder, as shown in FIGS. 2c and 2e. When the stay is broken, it no longer prevents pivotal movement of the outer cylinder 26 and the outer cylinder 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorber strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the outer cylinder 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the outer cylinder 26. A lower end of the lower link arm 20b defines a lug that is pivotally coupled to lugs of the stay arms 18a, 18b via the pivot pin 32. Lugs of the upper stay arm 18a are in this example disposed between the lugs of the lower stay arm 18b and the lugs of the lower link arm 20b.

Figure 2D:
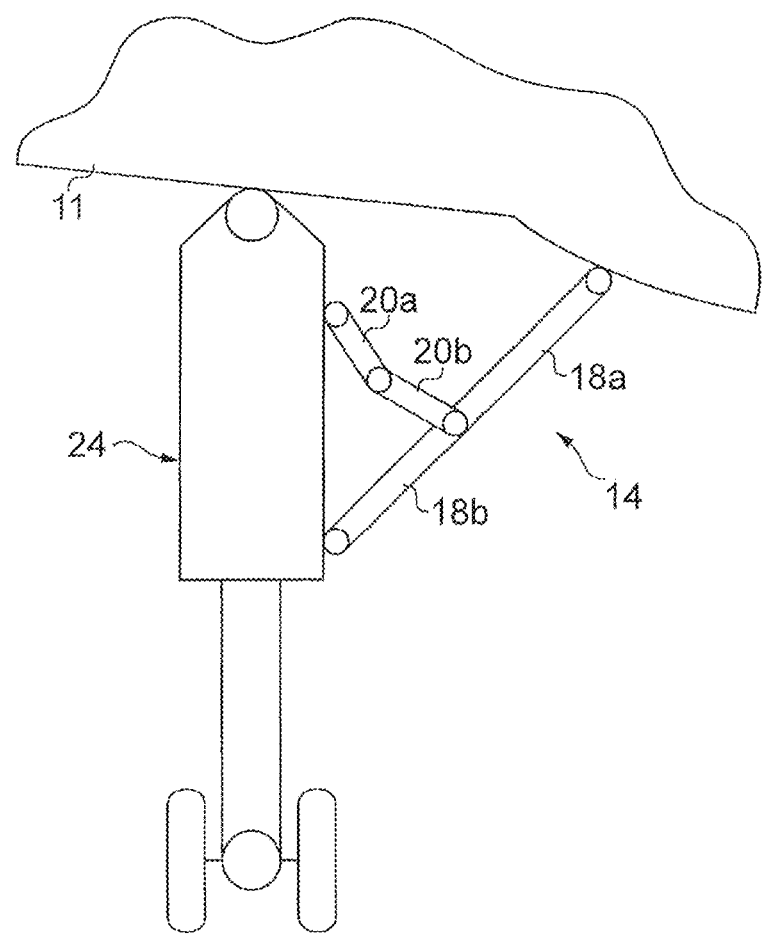
Figure 2E:
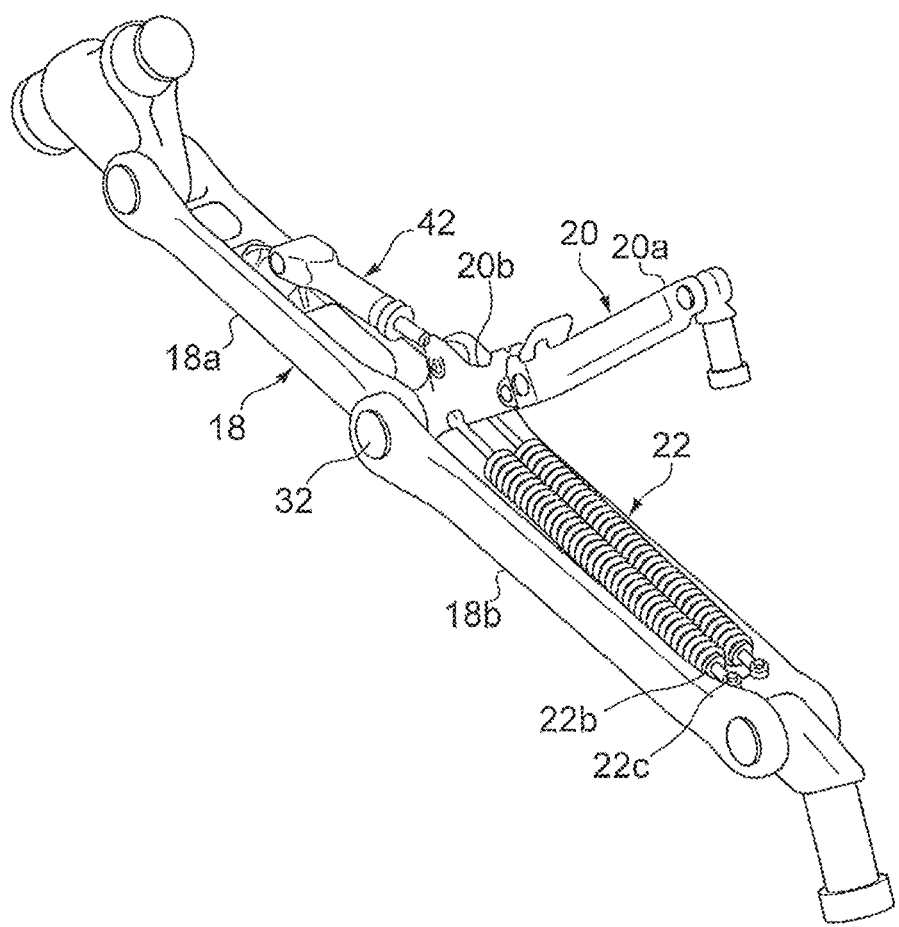

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the outer cylinder 26 to be moved by the retraction actuator towards the stowed condition.

One or more down-lock springs 22 are generally provided to assist in moving the landing gear assembly to the deployed condition and locking it in that state. Down-lock springs typically attach between two members either side of a joint such that one spring end is stretched in an arc relative to the other end, i.e. as a simple crank mechanism. The two members typically comprise a combination of lock links, stay members or landing gear shock absorber outer cylinder/main fitting. In the illustrated example the down-lock spring 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down-lock spring bias, allowing the landing gear assembly to be folded and stowed as described previously.

The down-lock spring 22 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress. The down-lock springs are required to provide a high load when the gear is locked down, and when it is close to being locked down, but load capability is not as important when the gear is retracted. The kinematics of known spring attachment points, in the simple crank form, result in continued displacement of the spring, such as stretching in the case of a tension spring, beyond the point when maximum load is required.

The present inventor has devised a new type of aircraft landing gear assembly which can use smaller and/or lighter down-lock springs in comparison to known landing gear assemblies.

Figure 3A:
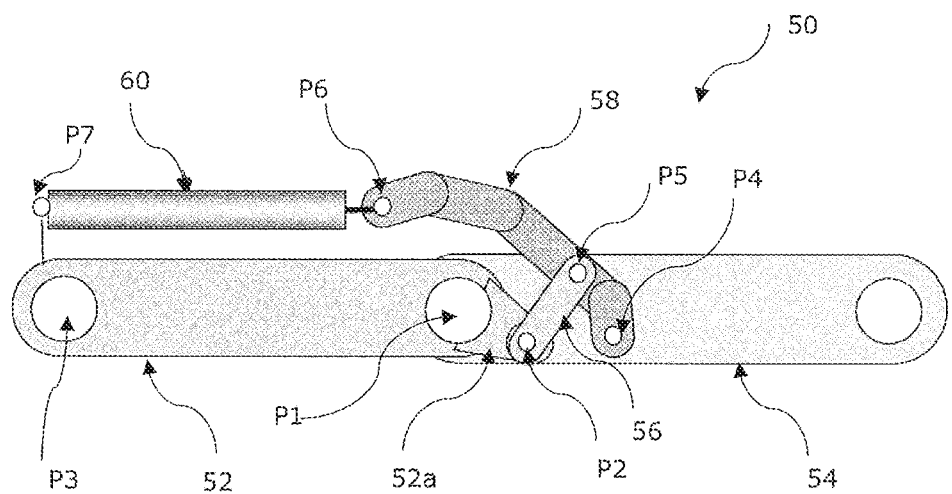
FIGS. 3a to 3c are a schematic diagrams of an aircraft landing gear assembly according to an embodiment of the invention.

Referring to FIG. 3a, part of an aircraft landing gear assembly according to an embodiment of the invention is shown generally at 50. The landing gear assembly is similar to the landing gear assembly described with reference to FIGS. 2a to 2e and, for brevity, the following description will focus on the differences.

A first structural member 52, which could for example be a lower stay arm, is provided with a protruding lug member 52a at the end carrying the apex pivot pin P1. The lug member 52a is pivotally coupled to a control link 56 via pivot pin P2. The lug member 52a is angularly offset with respect to an axis through the apex pivot pin P1 and distal mounting pivot pin P3 of the first structural member 52, such that the pivot pin P2 is offset, in this embodiment, by an angle of roughly 30 degrees. In other embodiments the whole linkage can be 'clocked round' for example, to bring the lug member onto the axis.

A second structural member 54, which could for example be an upper stay arm, is pivotally coupled to the first structural member 52 via the apex pivot pin P1. A generally C-shaped arm member 58 is pivotally mounted to the second structural member 54 via pivot pin P4 at a location which is generally in line with the pivot pin P2 when the first and second structural members 52, 54 are axially aligned, as shown in FIG. 3a. In this embodiment the C shaped member 58 is formed from four straight sections rigidly fixed to one another to define the C shape, but can in embodiments of the invention take any suitable form, such as a T shape or bell crank. The distance between the axes of pivot pin P4 and pivot pin P2 can be roughly equal to the distance between the axes of pivot pin P2 and pivot pin P1.

The control link 56 is pivotally coupled to arm member 58 via pivot pin P5. The free end of arm member 58 is pivotally coupled to one end of a down-lock spring 60 via pivot pin P6. The down-lock spring 60 is a coil spring arranged in tension. Pivot pin P5 is situated on the arm member 58 closer to pivot pin P4 than pivot pin P6. The other end of the down-lock spring 60 is coupled to a suitable structure, which could be the first structural member 52, via pivot pin P7.

Figure 3B:
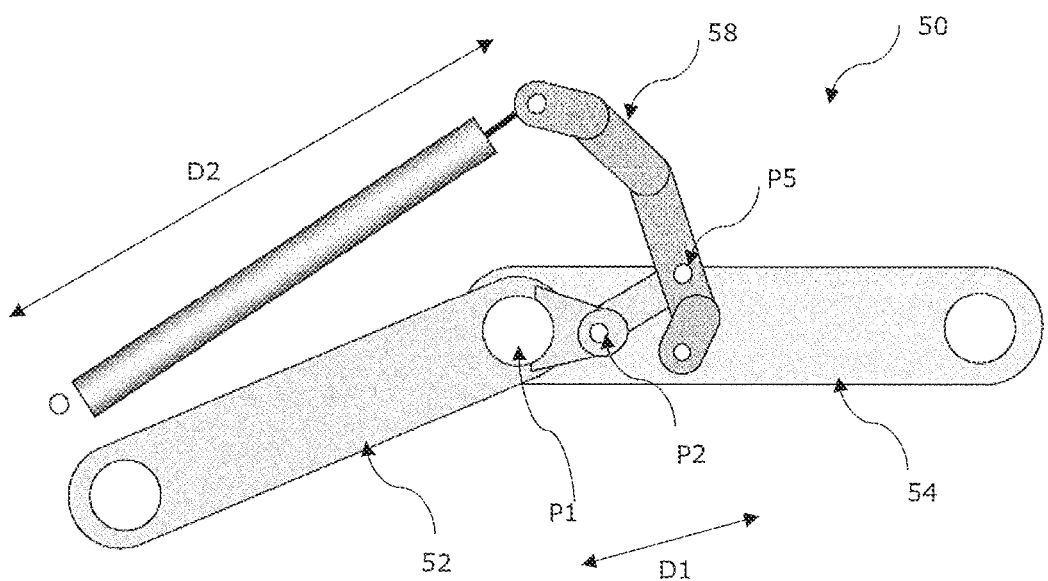

Referring additionally to FIG. 3b, as the first structural member 52 pivots relative to the second structural member 54 about the apex pivot pin P1, as the landing gear assembly begins to move from the fully deployed condition towards the stowed condition, the first control link pivot pin P2 moves in an arc towards an axis or plane bisecting the apex pin P1 and the second control link pivot pin P5, thereby increasing the distance D1 between the apex pin P1 and the second control link pivot pin P5 which in turn causes the arm member 58 to pivot about pin P4 in a first direction away from the apex pin P1. This in turn increases the distance D2 between the down-lock spring mounting pins P6, P7, thereby stretching the down-lock spring 60. This extended state assists the down-lock spring in biasing the structural members 52, 54 to assume the aligned condition shown in FIG. 3*a*.

Figure 3C:
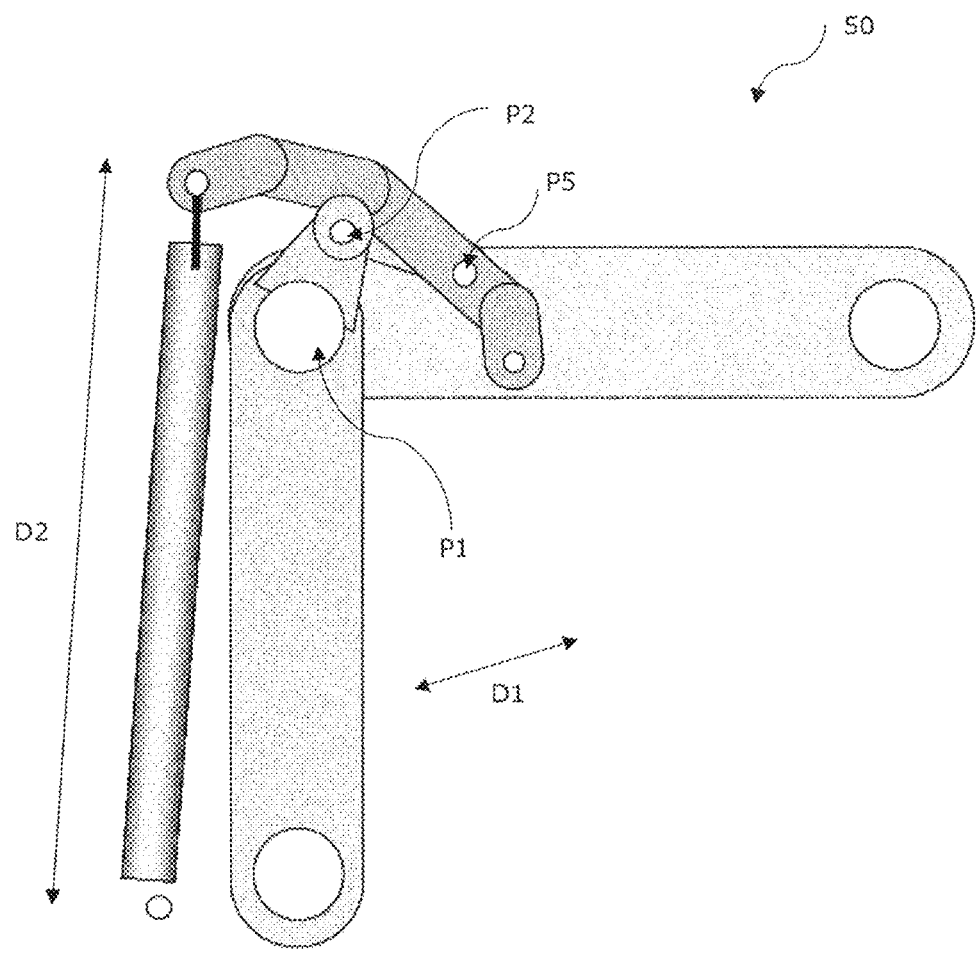

Referring additionally to FIG. 3*c*, as the first structural member 52 continues to pivot relative to the second structural member 54 about the apex pivot pin P1, as the landing gear assembly continues to move towards the stowed condition, the first control link pivot pin P2 continues to moves in an arc through and beyond the axis or plane bisecting the apex pin P1 and the second control link pivot pin P5, thereby decreasing the distance D1 between the apex pin P1 and the second control link pivot pin P5 which in turn causes the arm member 58 to pivot about pin P4 in a second direction towards the apex pin P1. This in turn decreases or maintains the distance D2 between the down-lock spring mounting pins P6, P7, as the gear continues to move to the stowed condition.

Thus, in contrast to known landing gear assemblies, the down-lock spring 60 does not continue to extend as the gear moves from the extended to stowed condition, thereby enabling a smaller and/or lighter down-lock spring to be provided. Moreover, the linkage enables spring extension to be initially increased relative to the extension that would occur with a conventional, direct connection, and for later extension to be reduced relative to a direct connection. The successive extension increase and decrease phases can occur early in the total movement window of the landing gear, for example within the first half of the total movement from fully deployed to fully retracted. The extension decrease phase can continue through to fully retracted.

Figure 4:
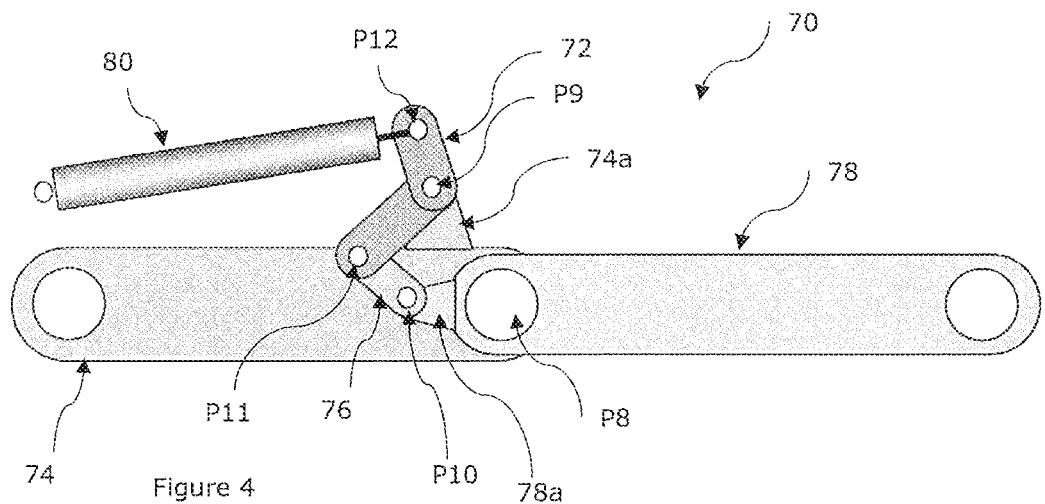
FIG. 4 is a schematic diagram of an aircraft landing gear assembly according to an embodiment of the invention.

FIG. 4 shows part of an aircraft landing gear assembly according to another embodiment of the invention generally at 70. The landing gear assembly 70 is similar to the landing gear assembly described with reference to FIGS. 3*a* to 3*c* and, for brevity, the following description will focus on the differences.

In this embodiment, the C shaped arm 72 is pivotally coupled to a lug member 74*a* extending from a side of the first structural member 74 at a location close to the end of the first structural member 74. The C shaped arm 72 is smaller than in the previous embodiment, formed from two straight sections rigidly coupled to one another and is pivoted near its centre by pivot pin P9. The control link 76 is pivotally coupled at a first end via pin P10 to a second lug member 78*a* which extends axially from the end of the second structural member 78 which carries the apex pin P8. The second end of the control link 76 is pivotally coupled to a first free end of the C shaped arm 72 closest to the first structural member 74 via pin P11. The other free end of the arm 72 is pivotally coupled to the down-lock spring 80 via pivot pin P12. As the landing gear assembly 70 moves from the illustrated deployed condition to the stowed condition, the pivot pin P10 at the first end of the control link 76 moves towards, through and beyond the central axis or plane bisecting the pin P11 at the first free end of the C shaped arm 72 and the apex pin P8, thereby causing the control link to move over centre.

Figure 5:
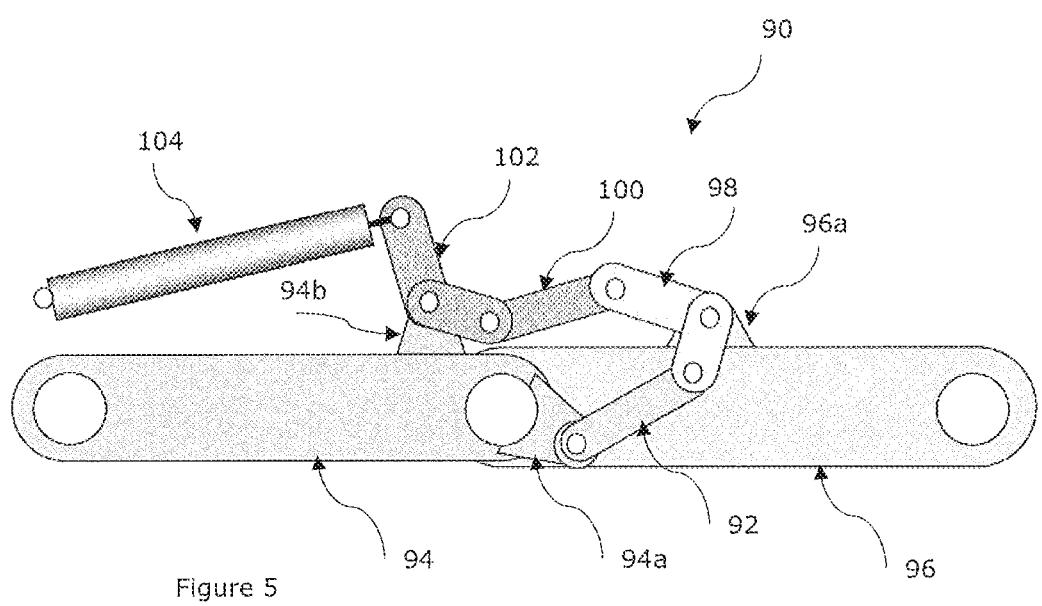
FIG. 5 is a schematic diagram of an aircraft landing gear assembly according to an embodiment of the invention.

FIG. 5 shows part of an aircraft landing gear assembly according to another embodiment of the invention generally at 90. The landing gear assembly 90 is similar to the landing gear assembly described with reference to FIGS. 3*a* to 3*c* and, for brevity, the following description will focus on the differences.

In this embodiment, a pair of C shaped arms and control links are provided in a cascaded manner. More specifically, a first control link 92 is pivotally coupled to a lug 94*a* on the first structural member 94, similar to lug 54*a*, extending at an angular offset from the longitudinal axis. The second structural member 96 has a lug 96 extending from the opposite side which carries a two component, first C shaped arm 98, one end of which is pivotally coupled to the first control link 92 and the other end of which is pivotally coupled to a second control link 100. The second control link 100 is in turn pivotally coupled to a second, two component C shaped arm 102 which is pivotally mounted on a second lug 94*b*, similar to lug 74*a*, extending from the first structural member 94 on the same side as the lug 96*a*. The other end of the second C shaped arm is pivotally coupled to the down-lock spring 104.

While each of the above-mentioned embodiments relate to mechanisms in which the down-lock spring operates across the hinged joint of a stay or lock link for example, in other embodiments the spring can operate between a the lock link and stay, such as the spring 22 in FIG. 2*e*. We will now go on to describe two such embodiments which are functionally similar to the embodiments of FIGS. 3*a* to 3*c* and FIG. 4 respectively and for brevity we will focus on the differences.

Figure 6A:
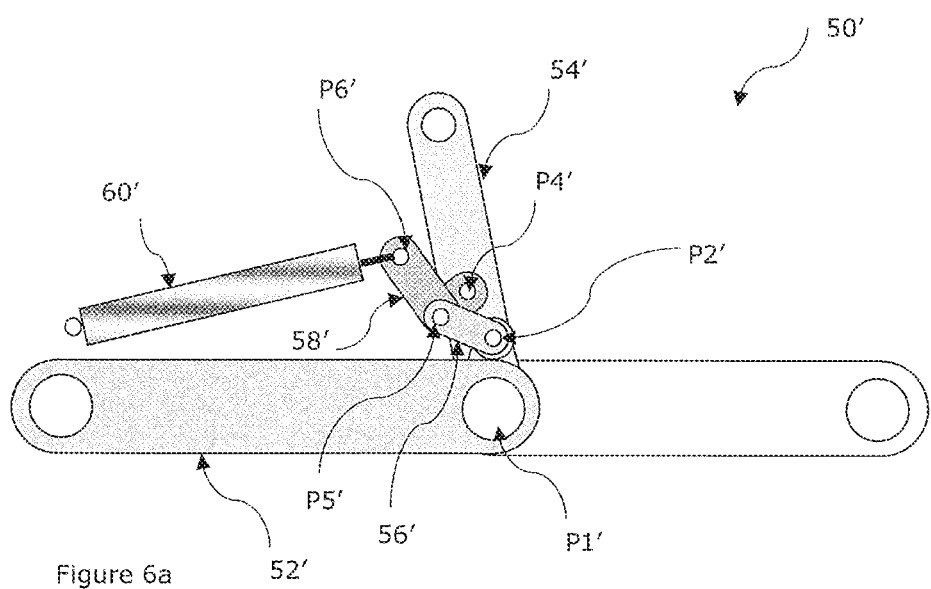
FIGS. 6a to 6c are a schematic diagrams of an aircraft landing gear assembly according to an embodiment of the invention.
Figure 6B:
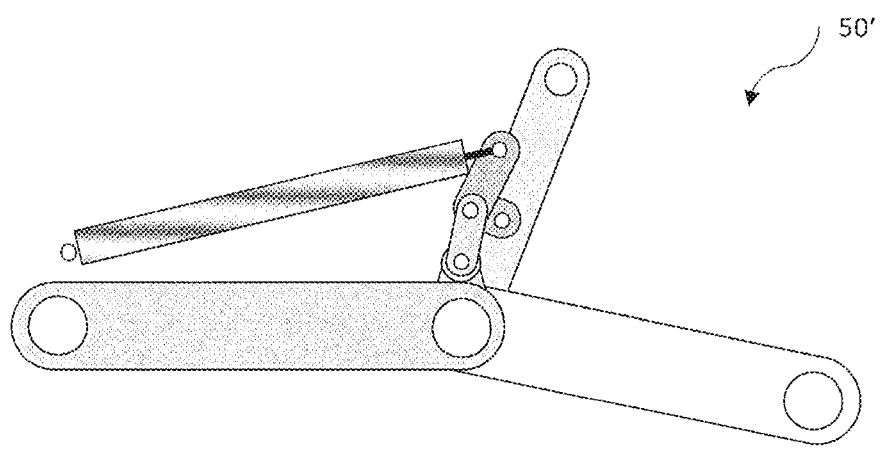
Figure 6C:
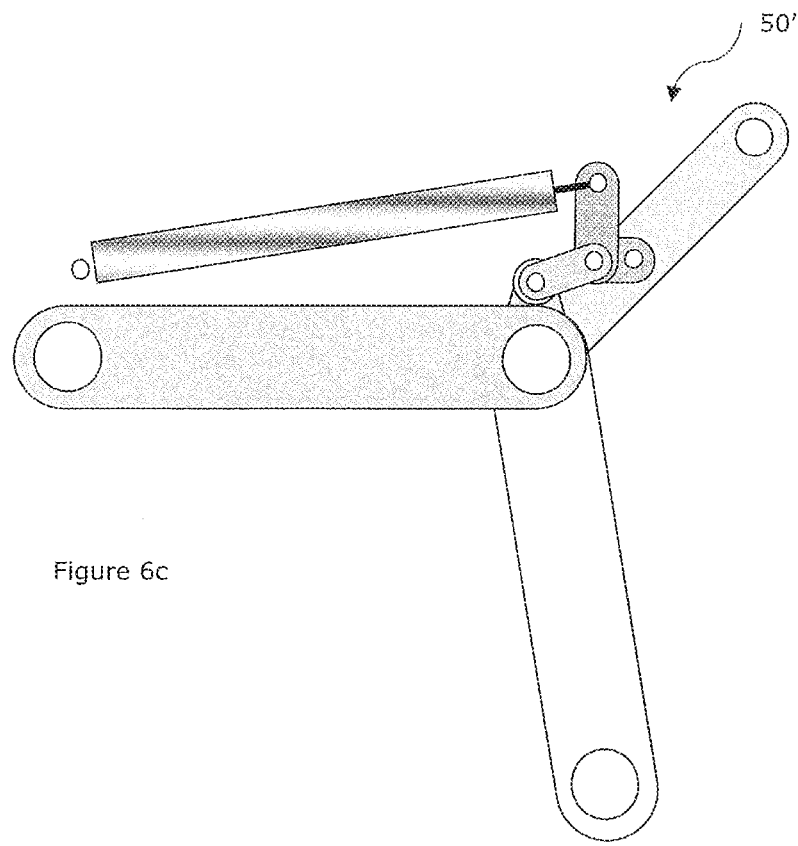

FIGS. 6*a* to 6*c* show an embodiment 50' which is functionally similar to the embodiment of FIGS. 3*a* to 3*c*, but in which the spring 60' operates between the lower stay arm 52' and the lower lock link 54'. As the lock link is broken and the lower lock link 54' pivots clockwise about the stay apex joint P1', the control link 56', which has one end pivotally coupled at P2' to a lug on lower stay arm 52' adjacent to the apex joint P1' and another end pivotally coupled at P5' to a mid-region of a L shaped arm 58', causes the L shaped arm to pivot clockwise about pivot P4' and, as shown in FIG. 6*b*, extends the down-lock spring 60' which is pivotally coupled to the free end of the L shaped arm 58' at pivot P6'.

As shown in FIG. 6*c*, as the landing gear articulates towards the stowed condition, the second control link pivot pin P5' moves in an arc through and beyond an axis or plane bisecting the first control link pivot pin P2' and the spring mounting pivot pin P6', thereby decreasing the distance between the pivot pins P2' and P6'.

Figure 7A:
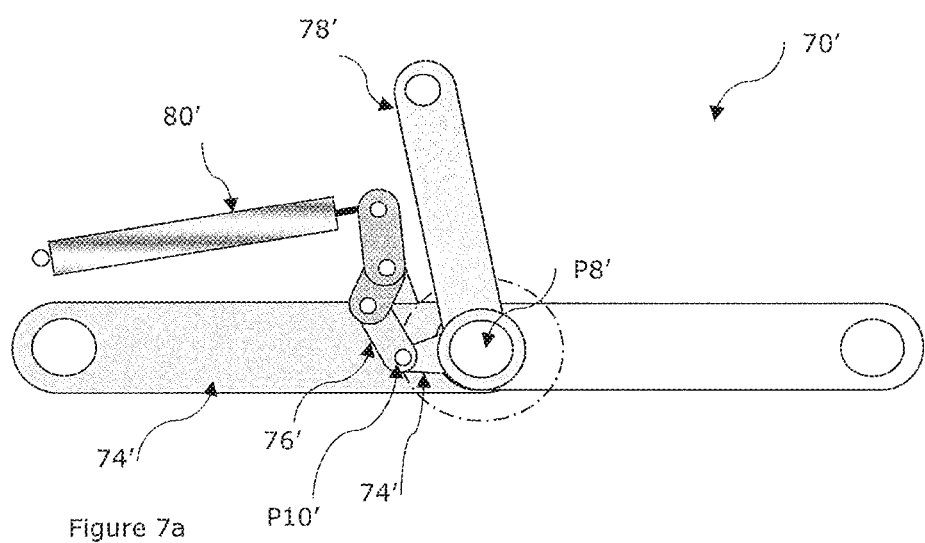
FIGS. 7a to 7c are a schematic diagrams of an aircraft landing gear assembly according to an embodiment of the invention.
Figure 7B:
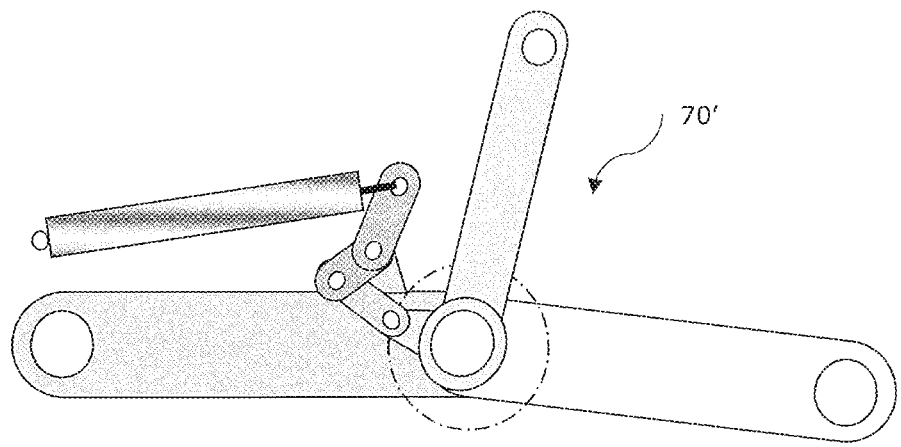
Figure 7C:
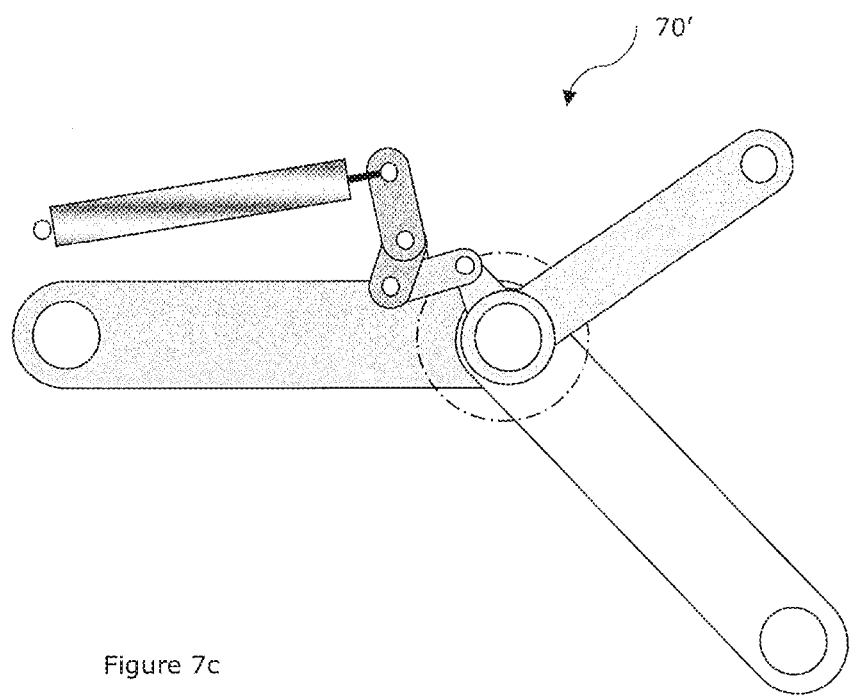

FIGS. 7*a* to 7*c* show an embodiment 70' which is functionally similar to the embodiment of FIG. 4, but in which the spring 80' operates between the lower stay arm 74' and the lower lock link 78'. The control link 76' is pivotally coupled at a first end via pin P10' to a lug member 78*a'* which extends laterally from the end of the lower lock link 78' which forms part of the apex joint. As the lower lock link P8 rotates clockwise from the position shown in FIG. 7*a* to that shown in FIG. 7*c*, the control link moves over-centre.

Figure 8:
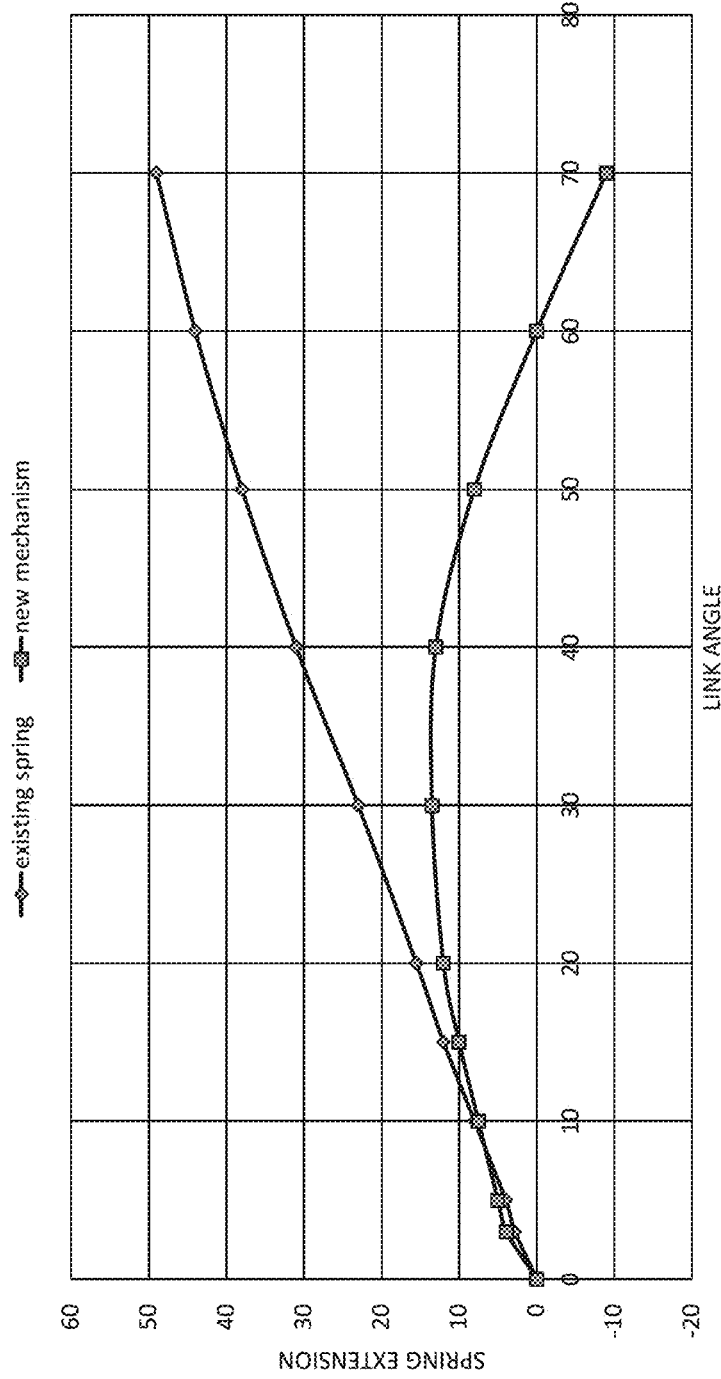
FIG. 8 is a graph showing spring velocity ratio for the aircraft landing gear assembly of FIGS. 7a to 7c due to link angle, in comparison to an aircraft landing gear assembly employing a direct spring connection to the link.

FIG. 8 shows a plot of spring extension vs. lower lock link 78' movement in degrees (spring velocity ratio) for the embodiment of FIGS. 7*a* to 7*c* in comparison to an arrangement having a direct connection between the spring and lower lock link ('existing spring'). The zero degree position is the lower lock link 78' relative to the lower stay 74' when the landing gear is deployed and locked down, as shown in FIG. 7*a*.

The 'existing spring' curve depends upon the radius and angular position of the spring attachment to the lower link. In this case a position on the centreline has been used.

The initial magnification factor is shown in the relative gradients between the two curves (proportional to the velocity ratio of the spring~mechanical advantage ignoring friction).

The mechanism of FIGS. 7*a* to 7*c* has a similar or slightly greater extension rate around zero degrees (where the spring effort is most needed) but then drops off with further movement of the lock link. Depending upon how far the lower lock link swings, and the exact link lengths and angles of the new mechanism, the linkage can allow the spring to relax from its maximum extension and can contract below its initial, gear down length.

As can be seen, the mechanism of FIGS. 7a to 7c limits this additional extension to 13 (units are arbitrary) whereas the direct connection spring eventually extends 49 (or more or less depending upon how far the lock link swings, which will depend upon the lock link and stay geometry). Since the maximum spring stress will be at maximum spring extension this would impact the sizing of the spring, requiring a lower spring stiffness to accommodate the larger stretch and hence less spring effort in earlier parts of the curve.

Thus, FIG. 8 illustrates a first portion of movement with a maximum magnification factor of roughly 1.3 and for later movement, assuming that the lock link swings through 70 degrees, a second portion of movement with an extension reduction by a factor of 0.265 or roughly a reduction of 4.

Embodiments of the invention can employ a reduction in conventional spring attachment radius, or a change in link lengths of the new mechanism, so that the initial magnification factor is larger and the reduction factor less. i.e. the vertical scaling of either curve can be changed to whatever is desired. As such, the benefit may be taken either by magnifying extension and thus effort at the beginning of the retraction movement, or by reducing maximum spring extension during the retraction. The two may be traded via the characteristics of the spring.

While the embodiment of FIGS. 7a to 7c has been illustrated in FIG. 8, the mechanisms of other embodiments will have similar characteristics.

It will be appreciated that the over-centre mechanisms described herein can be applied to various types of aircraft landing gear assembly and the various link lengths can be adapted to suit slightly different stay geometries and angles between links.

Components of the aircraft landing gear assembly according to embodiments of the invention can be implemented from conventional aerospace materials, such as titanium, aluminium and/or steel for structural members, polymer or metal bearings etc.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a first structural member;
   a second structural member pivotally coupled to the first structural member at an apex pivot point so as to be movable between a first angular condition and a second angular condition distinct from the first angular condition;
   a down-lock spring having a first end region pivotally coupled to a mounting structure and being arranged under tension to bias the first and second structural members to assume the first angular condition; and
   a linkage assembly, the linkage assembly comprising:
      an arm member pivotally coupled to one of the first and second structural members at an arm pivot point, the arm having a first end region pivotally coupled to a second end region of the down-lock spring; and
      a control link pivotally coupled to one of the first and second structural members at a first control link pivot point and pivotally coupled to the arm member at a second control link pivot point such that, as the first and second structural members move relative to one another from the first angular condition towards the second angular condition, the first control link pivot point moves over centre, through an axis or plane bisecting the apex pivot point and the second control link pivot point,
   wherein one of the first and second structural members is a lock link, and the other of the first and second structural members is a stay arm.

2. The aircraft landing gear assembly according to claim 1, further comprising:
   a shock absorber strut arranged to be moved between a deployed condition for take-off and landing and a stowed condition for flight; and
   a wheel or other ground contacting assembly coupled to the shock absorber strut, wherein the landing gear assembly is arranged such that the shock absorber strut is held in the deployed condition when the first and second structural members are in the first angular condition.

3. The aircraft landing gear assembly of claim 1, wherein the arm member is longitudinally nonlinear.

4. The aircraft landing gear assembly of claim 3, wherein the arm member is longitudinally C shaped.

5. The aircraft landing gear assembly of claim 1, wherein the arm member is pivotally coupled to the second structural member, the arm pivot point is at a first end region of the arm and the control link is pivotally coupled to the first structural member.

6. The aircraft landing gear assembly of claim 5, wherein the second control link pivot point is located on the arm at a location which is closer to the arm pivot point than the point via which the arm is pivotally coupled to the spring.

7. The aircraft landing gear assembly of claim 1, wherein the linkage assembly is arranged such that, as the structural members move from the first angular condition to the second angular condition, the spring extension is magnified in comparison to an equivalent arrangement having a direct connection between the down-lock spring and structural member for a first portion of the movement and/or is reduced in comparison to the direct connection arrangement for a second portion of the movement.

8. The aircraft landing gear assembly of claim 7, wherein the magnification is at least by a factor of 1.2 and/or the reduction is at least by a factor of 2 and preferably the reduction factor results in the down-lock spring being shorter when in the stowed condition that when in the deployed condition.

9. The aircraft landing gear assembly of claim 7, wherein the second portion of the movement begins within a first half of the total movement of the landing gear from the fully deployed to the fully stowed condition.

10. The aircraft landing gear assembly of claim 1, wherein the arm pivot point is at a central region of the arm.

11. The aircraft landing gear assembly of claim 10, wherein the arm member is pivotally coupled to the first structural member, the control link is pivotally coupled to the second structural member and the second control link pivot point is located at a second end region of the arm opposite to the first end region which is pivotally coupled to the down-lock spring.

12. The aircraft landing gear assembly of claim 10, wherein the arm member is pivotally coupled to the first structural member, the control link is pivotally coupled to the second structural member and the linkage assembly further comprises a second C shaped arm pivotally coupled to the second structural member at a second arm pivot point located at a central region of the second arm, the second control link pivot point being located at a first end region of the second arm, the linkage assembly further comprising a second control link pivotally coupled to one of the first and second structural members at a first control link pivot point and pivotally coupled to a second end of the second arm at a third control link pivot point and pivotally coupled to a second end of the C shaped arm at a fourth control link pivot point such that, as the first and second structural members move relative to one another from the aligned condition towards the non-aligned condition, the first control link pivot point moves over centre, though an axis or plane bisecting the apex pivot point and the second control link pivot point and the third control link pivot point moves over centre, though an axis or plane bisecting the arm pivot point and the fourth control link pivot point.

13. An aircraft including one or more aircraft landing gear assemblies according to claim 1.

14. An aircraft landing gear assembly comprising:

a first structural member;

a second structural member pivotally coupled to the first structural member at an apex pivot point so as to be movable between a first angular condition and a second angular condition distinct from the first angular condition;

a down-lock spring having a first end region pivotally coupled to a mounting structure and being arranged under tension to bias the first and second structural members to assume the first angular condition; and a linkage assembly, the linkage assembly comprising:

an arm member pivotally coupled to one of the first and second structural members at an arm pivot point, the arm having a first end region pivotally coupled to a second end region of the down-lock spring; and a control link pivotally coupled to one of the first and second structural members at a first control link pivot point and pivotally coupled to the arm member at a second control link pivot point such that, as the first and second structural members move relative to one another from the first angular condition towards the second angular condition, the first control link pivot point moves over centre, through an axis or plane bisecting the apex pivot point and the second control link pivot point, wherein the down-lock spring and arm member are both coupled to the same structural member.

\* \* \* \* \*